(12) United States Patent
Gao et al.

(10) Patent No.: US 8,279,073 B2
(45) Date of Patent: Oct. 2, 2012

(54) SYSTEMS, METHODS, AND APPARATUS FOR MONITORING AND CONTROLLING A WIND DRIVEN MACHINE

(75) Inventors: Meng Gao, Shanghai (CN); Haiqi Zhao, Shanghai (CN); Zheng Wan, Shanghai (CN)

(73) Assignee: General Electric Company, Schenectady, NY (US)

( * ) Notice: Subject to any disclaimer, the term of this patent is extended or adjusted under 35 U.S.C. 154(b) by 428 days.

(21) Appl. No.: 12/562,525

(22) Filed: Sep. 18, 2009

(65) Prior Publication Data

US 2010/0138060 A1    Jun. 3, 2010

(51) Int. Cl.
    *G08B 21/00*    (2006.01)
(52) U.S. Cl. .................. 340/635; 340/3.62; 340/825.49
(58) Field of Classification Search .................. 340/635, 340/636.1–636.13, 636.15, 636.19, 660, 340/691.6, 3.42–3.44, 3.62, 825.36, 825.49
    See application file for complete search history.

(56) References Cited

U.S. PATENT DOCUMENTS

| | | | | |
|---|---|---|---|---|
| 7,642,748 B2 * | 1/2010 | Glosser et al. | ................. | 320/116 |
| 8,026,623 B2 * | 9/2011 | Wakasa et al. | .................. | 290/44 |
| 2008/0181761 A1 * | 7/2008 | Moore et al. | ........................ | 415/1 |
| 2010/0158687 A1 * | 6/2010 | Dawson et al. | ................. | 416/31 |

FOREIGN PATENT DOCUMENTS

| | | |
|---|---|---|
| EP | 00945613 B1 | 3/1999 |
| EP | 01571334 A1 | 3/2004 |
| EP | 01788238 A2 | 11/2006 |
| EP | 01865198 A2 | 5/2007 |
| WO | 03091577 A1 | 11/2003 |
| WO | 2005019642 A1 | 3/2005 |
| WO | 2007006301 A1 | 1/2007 |
| WO | 2008053017 A2 | 5/2008 |
| WO | 2009003478 A2 | 1/2009 |
| WO | 2009042581 A1 | 4/2009 |

OTHER PUBLICATIONS

European Search Report and Written Opinion issued in connection with EP Application No. 10175692.2, Jan. 11, 2011.

\* cited by examiner

*Primary Examiner* — Daniel Previl
(74) *Attorney, Agent, or Firm* — Sutherland Asbill & Brennan LLP

(57) ABSTRACT

Embodiments of the invention can provide systems, methods, and apparatus for monitoring and controlling a wind driven machine. According to one embodiment, a system including a wind driven machine with at least one component can be provided. The system can also include at least one data collection module for collecting operating data from the at least one component and for providing the operating data to at least one data processing module. The operating data can comprise an electrical characteristic associated with the at least one component. The data processing module can receive the operating data, determine whether the operating data indicates the component is operating in an alert condition and can provide an indicator when the component is operating in an alert condition.

20 Claims, 2 Drawing Sheets

SYSTEMS, METHODS, AND APPARATUS FOR MONITORING AND CONTROLLING A WIND DRIVEN MACHINE

FIELD OF THE INVENTION

The invention relates to wind driven machines, and more specifically, to systems, methods, and apparatus for monitoring and controlling a wind driven machine.

BACKGROUND OF THE INVENTION

Wind driven machines such as wind mills, wind driven generators, and wind wheel type machines can be adapted to provide useful work and/or for energy conversion. Wind turbines, for example, are a type of wind driven machine that can be used for energy conversion and to provide a source of alternative energy. A wind turbine can include a housing or nacelle positioned atop a truss or a tubular tower. Typically mounted to the nacelle is a rotor having multiple blades that are aerodynamically designed to transform wind energy into a form of mechanical energy. For instance, through their aerodynamic design, the multiple blades positioned about a rotor can transform the kinetic energy of the wind into rotational motion of the rotor, a form of mechanical energy. The rotational motion of the rotor can be used to drive a mechanical load or be further converted into electrical energy using one or more generators.

Because wind energy can vary in intensity and/or direction, wind driven machines like wind turbines can include one or more components for adapting certain characteristics of the turbine to ambient conditions, thereby improving the wind driven machine's efficiency. For example, a wind turbine can include components associated with yaw control for turning the rotor and blades into the direction of the wind. Additional components can be included for pitch control to turn the blades and to increase or decrease the aerodynamic load. Other components associated with turbine control and modification can also be provided. Because these components are associated with wind turbine efficiency, their reliable and continuous operation is generally desired. Conventional wind turbines, however, have only limited safeguards for ensuring these components are functioning properly. When one or more of these components begin operating in an alert condition, which could indicate the component is malfunctioning, the efficiency of the wind turbine suffers. In some instances, when one or more of these components malfunctions, the wind turbine may require deactivation, resulting in power disruption and economic loss.

Thus, there is a need to reduce power disruptions associated with the operation of wind driven machines. More specifically, there is a need for systems, methods, and apparatus for monitoring and controlling a wind driven machine.

BRIEF DESCRIPTION OF THE INVENTION

Embodiments of the invention can address some or all of the needs described above. Certain embodiments of the invention are directed generally to systems, methods, and apparatus for monitoring and controlling a wind driven machine. According to one embodiment, a method for monitoring and controlling a wind driven machine can be provided. The method can include operating a component in a wind driven machine at an operating condition. The method can also include determining whether an alert condition associated with the component in the wind driven machine exists based on an electrical characteristic associated with the component. The method can further include outputting an indicator when an alert condition associated with the component in the wind driven machine exists.

According to another embodiment of the invention, a system for monitoring and controlling a wind driven machine can be provided. The system can include a wind driven machine having a component and a data collection module for collecting operating data from the component. The system can also include a data processing module for receiving the operating data, for determining whether the operating data indicates the component is operating in an alert condition, and for providing an indicator when the component is operating in an alert condition. The operating data can comprise an electrical characteristic associated with the component.

According to yet another embodiment of the invention, an apparatus for monitoring and controlling a wind driven machine can be provided. The apparatus can include data collection module for collecting operating data from a component in a wind driven machine. The apparatus can also include a data processing module for receiving the operating data, for determining whether the operating data indicates the component is operating in an alert condition, and for providing an indicator when the component is operating in an alert condition.

Other embodiments and aspects of the invention will become apparent from the following description taken in conjunction with the following drawings.

BRIEF DESCRIPTION OF THE DRAWINGS

Figure 1:
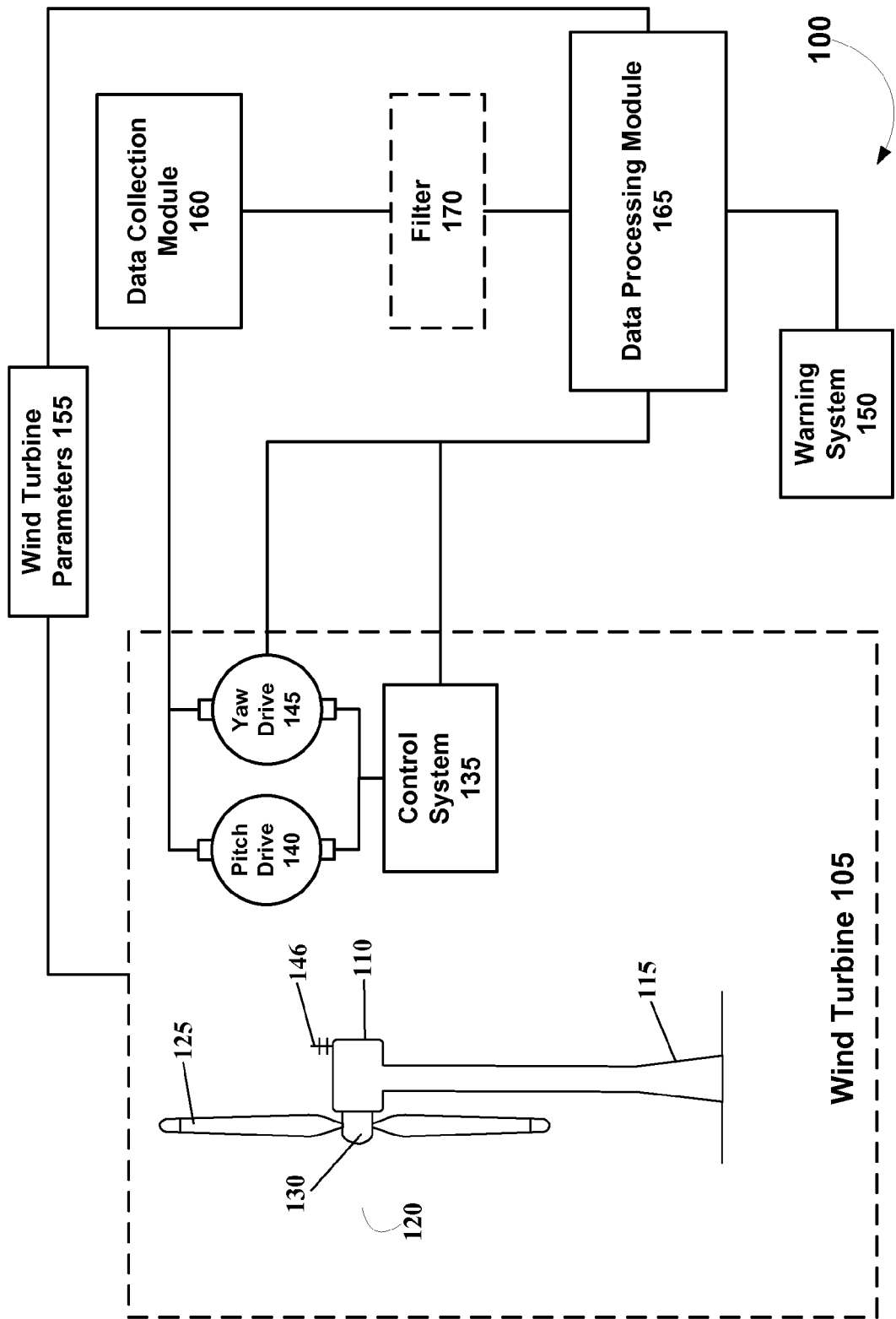

Having thus described the invention in general terms, reference will now be made to the accompanying drawings, which are not necessarily drawn to scale, and wherein:

FIG. 1 illustrates an exemplary system and apparatus for monitoring and controlling a wind driven machine in accordance with one embodiment of the invention.

Figure 2:
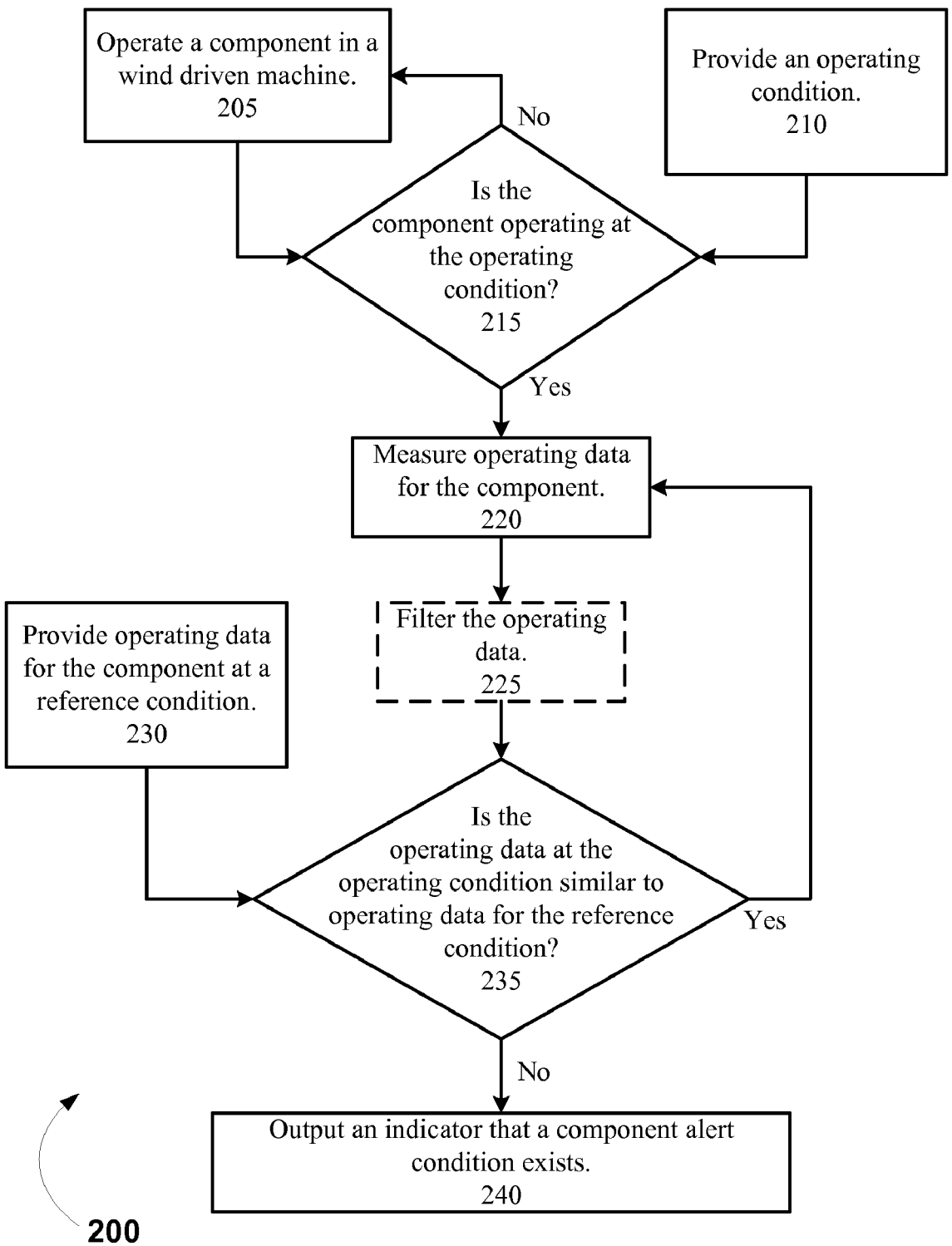

FIG. 2 illustrates an exemplary method for monitoring and controlling a wind driven machine in accordance with one embodiment of the invention.

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. The term "exemplary" used herein and throughout the specification means example, and is merely intended to indicate an example. Like numbers refer to like elements throughout.

FIG. 1 illustrates an exemplary system 100 according to one embodiment of the invention. System 100 can include any wind driven machine such as a wind mill, a wind driven generator, a wind wheel type machine, or a wind turbine like wind turbine 105, which is illustrated as part of exemplary system 100. Wind turbine 105 can comprise a nacelle 110 mounted atop a truss or tower 115. Wind turbine 105 also comprises a rotor 120 that includes a plurality of rotor blades 125 mounted to a rotating hub 130. By way of example, the wind turbine 105 illustrated in FIG. 1 can include two rotor blades 125.

As part of exemplary system 100, nacelle 110 can house a number of components, such as a generator for generating electrical power and/or one or more components associated with turbine operation and performance, such as control system 135. Control system 135 can comprise one or more microcontrollers operable for overall system monitoring and control including pitch and speed regulation, shaft and yaw brake application, and fault monitoring to name a few. In the illustrated embodiment, control system 135 is illustrated as being part of a central control architecture within wind turbine 105. In other embodiments, distributed and/or remotely located control architectures can be used.

As indicated above, control system 135 can be associated with system monitoring and control to improve, maintain, or modify wind turbine 105 performance, such as by interfacing with one or more components. One such component can be pitch drive 140, which can comprise a DC pitch drive motor for controlling the pitch of blades 125. The pitch of blades 125 can be associated with harnessing the kinetic energy of the wind and for driving rotating hub 130. It will be appreciated that while in the illustrated embodiment, control system 135 is shown as providing control to pitch drive 140, in other embodiments, the pitches of blades 125 can be controlled by individual controllers or other control mechanisms and modules rather than, or in combination with, a control architecture like control system 135.

Another component associated with the performance of wind turbine 105 can be yaw drive 145. Yaw drive 145 can provide yaw orientation for wind turbine 105. In the illustrated embodiment, yaw drive 145 can be operated and/or controlled by control system 135, such as through one or more sensors for measuring flange displacement and/or through wind vane 146. In other embodiments, yaw drive 145 can be operated by individual controllers or other control mechanisms and modules rather than, or in combination with, a control architecture like control system 135. Yaw orientation for wind turbine 105 can correspond to the position of rotor 120 in relation to wind direction. It is generally desirable to orient rotor 120 facing the direction of the wind, thereby reducing the angle of incidence between blades 125 and the wind's kinetic energy. Once a desired position is reached, wind turbine 105 can be maintained in this position or further adapted as variations in wind direction require.

Components such as pitch drive 140 and yaw drive 145 can be useful for wind turbine 105 operation. In conventional systems, however, no monitoring or control is provided to such components. Because components like pitch drive 140 and yaw drive 145 can malfunction, without any monitoring or control, conventional systems can suffer lasting damage or even require shut down when such malfunction occurs. For instance, when components like yaw drive 145 falter or fail, damage can result to the associated pinions and gears. This damage can not be easily detected or repaired without manual inspection, which often does not occur for a lengthy period of time. At other times, the severity of the damage can trigger the wind turbine's deactivation, resulting in shutdown and power loss.

Embodiments of the invention, such as system 100 shown in FIG. 1, can generally avoid these lasting effects and can reduce power losses associated with component malfunction that could result in system deactivation. System 100 can provide continuous and/or selective monitoring of one or more components of a wind driven machine like pitch drive 140 and yaw drive 145. When abnormal operation is detected, system 100 can modify the performance of wind turbine 105, or other wind driven machine, to prevent or reduce lasting damage and/or power loss. For example, system 100 can generate a warning or fault message via warning system 150 for indicating an alert condition and/or for requesting manual inspection. In other embodiments, system 100 can modify wind turbine 105 performance by isolating a malfunctioning component and redirecting control of wind turbine 105 to other components based on ambient conditions and/or other wind turbine parameters as shown at 155. In one embodiment, wind turbine 105 can include multiple yaw drives 145 so that should one yaw drive 145 malfunction, power to the malfunctioning yaw drive 145 can be interrupted or a brake utilized.

In one embodiment, a brake can be utilized to halt operation of the malfunctioning yaw drive 145. In another embodiment, a brake can be disabled to allow the malfunctioning yaw drive 145 to operate freely and to reduce the likelihood of further damage. In either embodiment, control of the remaining yaw drives 145 can be modified to compensate for the malfunctioning yaw drive 145. In some embodiments, to avoid lasting damage that can result for the reduced number of components available for yaw control, wind turbine 105 can be derated to account for ambient conditions and/or other wind turbine parameters 155. In these embodiments, while power produced from wind turbine 105 is reduced, power is not lost and relatively less damage to wind turbine 105 can result from the malfunctioning yaw drive 145 due to the reduced load.

System 100 can include data collection module 160. Data collection module 160 can be operable to collect operating data associated with one or more components in a wind driven machine like wind turbine 105. In one embodiment, data collection module 160 can include one or more sensors for providing information associated with one or more components of wind turbine 105. For instance, data collection module 160 can comprise current measurement sensors coupled to a power supply and to one or more components in wind turbine 105, such as pitch drive 140 and/or yaw drive 145. In other embodiments, current measurement sensors can be coupled to data collection module 160. Current measurement sensors can measure the electrical current delivered to one or more components in wind turbine 105, such as pitch drive 140 and/or yaw drive 145. When one or more components such as pitch drive 140 or yaw drive 145 malfunction, an abnormal electrical load can result and can be measured by said current measurement sensors. Data collection module 160 can be adapted to measure and/or record the abnormal electrical load and to provide abnormal electrical load information to data processing module 165.

In one embodiment of the invention, system 100 can include filter 170 for conditioning the operating data provided by data collection module 160 to data processing module 165. Collectively, the data collection module 160 and data processing module 165 can be referred to as an apparatus but may be embodied as individual or distinct components. In conditioning the operating data provided by data collection module 160 to data processing module 165, filter 170 can reduce distortions and/or disruptions in the operation of system 100 that can result from temporary fluctuations in certain parameters, conditions, and/or measurements. In one embodiment, filter 170 can be coupled to data collection module 160 and data processing module 165. In another embodiment, filter 170 can be coupled to one or more sensors and data collection module 160. In other embodiments, filter 170 can be integrated into data collection module 160 and/or data processing module 165.

Data processing module 165 can be operable to receive operating data from data collection module 160 and to determine whether a component alert condition exists based partly on the operating data provided. A component alert condition can correspond to the operating condition of one or more components. For example, in some embodiments, a component alert condition can correspond to a malfunctioning component, such as a component that is operating abnormally, is faltering, or is failing. In some embodiments, a component alert condition can correspond to a properly functioning component and/or a component operating within a normal operating range. In other embodiments, a component alert condition can correspond to any or all of the above.

Data processing module 165 can comprise various controllers, modules, and/or memory structures for receiving data, storing data, and comparing data. According to the illustrated embodiment, after receiving operating data from data collection module 160 associated with one or more components such as pitch drive 140 and/or yaw drive 145, data processing module 165 can compare the received operating data with at least one reference condition or operating data comprising at least one reference condition to determine whether an alert condition exists.

In one embodiment, operating data for a reference condition can be statistically determined and based on historical operational data. For instance, operating data for a reference condition can comprise an average value and can include zero or more standard deviations for a component in the wind turbine according to the component's functional characteristics over a period of time. In another embodiment, operating data for a reference condition can be predefined, such as through measurements taken during one or more test conditions. In other embodiments, operating data for a reference condition can include a threshold value, and still in other embodiments, operating data for a reference condition can be based at least in part on industry standards, legal regulations, or design constraints.

When comparing the operational data provided by data collection module 160 to operating data for a reference condition, an alert condition can be evidenced by the difference between an expected reference value and the real time value provided by data collection module 160. Should an alert condition exist, data processing module 165 can output an indicator as described further below.

System 100 can be adapted to continuously monitor and control a wind driven machine like wind turbine 105 or to selectively monitor and control a wind driven machine like wind turbine 105. That is, an operating condition for determining whether an alert condition exists can be either a continuous operating condition or a selected operating condition, such as an operational test. In one embodiment, system 100 can be adapted for continuous monitoring, and the operating condition can be defined according to an ambient condition associated with the wind driven machine or other parameter as shown at 155. Based on wind turbine parameters 155, such as an ambient condition associated with the wind turbine 105 comprising one or more of a wind speed, a pitch angle, or a power output of wind turbine 105, system 100 can determine whether one or more alert conditions exists. For example, in one embodiment data processing module 165 can store operational data for a plurality of wind turbine parameters. As wind turbine parameters 155 are provided to data processing module 165, the operating data for the reference condition defined by the wind turbine parameters 155 can be retrieved by data processing module 165 and compared to the operating data provided by the data collection module 160. In other embodiments, data processing module 165 can estimate the operating data for the reference condition using wind turbine parameters 155 and can compare the expected operating data to operating data provided by the data collection module 160.

In other embodiments, system 100 can be adapted to selectively monitor and control a wind driven machine like wind turbine 105 during one or more sampling periods. Sampling periods can be based on one or more specified conditions. For instance, low wind speed may provide a good opportunity for selectively monitoring a wind driven machine like wind turbine 105 given the lower demands and loads associated with lower wind speeds. Particular pitch angles or power outputs for wind turbine 105 may also provide good opportunities as can certain operational tests. Operational tests can include any functional test associated with wind turbine 105, such as a cable twist release test, a yaw operational test, or a pitch battery test, all of which can be performed at various wind speeds and with or without power being produced by wind turbine 105.

When one or more sampling conditions are met, system 100 can selectively monitor a wind driven machine like wind turbine 105 through data collection module 160 and data processing module 165 by recording current levels associated with one or more components, such as pitch drive 140 and/or yaw drive 145, and by comparing recorded values to one or more reference values. It will be appreciated that as system 100 can selectively monitor wind turbine 105 during specified sampling periods, system 100 can also selectively monitor wind turbine 105 during multiple sampling periods. For instance, according to one aspect of the invention, sampling periods can be combined to form a multi-sampling period with corresponding multi-reference criteria. Selectively monitoring wind turbine 105 over multiple sampling periods may improve failure detections by correlating component operational features across dissimilar reference periods. As an example, if an abnormal current load for yaw drive component 145 is detected during one sampling period A, the yaw drive component 145 component can be selectively monitored during another sampling period B to further evaluate whether an alert condition may exist.

If data processing module 165 determines an alert condition exists for one or more components of wind turbine 105, data processing module 165 can output an indicator of the alert condition. Such an indicator can correspond to triggering an alarm and/or a fault message in warning system 150 for indicating a malfunctioning component, for requesting maintenance, or for assisting inspection. Such an indicator can also correspond to one or more command signals provided to wind turbine 105 and/or the one or more malfunctioning components.

In one exemplary embodiment, the indicator can correspond to a command signal provided to control system 135 for derating a wind driven machine like wind turbine 105, such as when one of a plurality of yaw drives 145 malfunctions. If one yaw drive 145 malfunctions, the data processing module 165 can provide a command signal to control system 135 identifying the malfunctioning yaw drive 145. Control system 135 can compensate for the malfunctioning yaw drive 145 by adapting the remaining yaw drives 145 accordingly. Such compensation can be based on the power production load of wind turbine 105 and/or on ambient conditions associated with wind turbine 105 like wind speed, pitch angle, and turbulence measures. In this exemplary embodiment, the remaining yaw drives 145 can operate under a limited load condition without suffering lasting damage. Should additional yaw drives 145 malfunction, then control system 135 can further derate the wind driven machine and can even deactivate the wind driven machine to avoid lasting damage, such as when a plurality of yaw drives 145 malfunction.

In another exemplary embodiment, indicators provided by data processing module 165 can be associated with a malfunctioning component. To illustrate, yaw drive 145 can comprise two control components: one a circuit breaker linked to a power supply; the other a brake for releasing or stopping the drive. According to the indicator provided by data processing module 165, power to a malfunctioning yaw drive 145 can be interrupted through activation of the circuit breaker, or the malfunctioning yaw drive 145 can be stopped or released through utilization of the brake. In such embodiments, the malfunctioning yaw drive 145 can be isolated when an alert condition exists, and damage associated with the malfunctioning yaw drive 145 can be reduced.

FIG. 2 illustrates an exemplary method 200 for monitoring and controlling a wind driven machine. Method 200 can begin at block 205 where a component in a wind driven machine, such as wind turbine 105, can be operated. The component can be any component in a wind driven machine, such as pitch drive 140 or yaw drive 145. In addition, more than one component in a wind driven machine can be operated at block 205, such as a plurality of pitch drives 140, a plurality of yaw drives 145, or a plurality combination of each.

At block 210, an operating condition can be provided. An operating condition can be either a continuous operating condition or a selective operating condition. At block 210 the operating condition can be provided according to one or more ambient conditions associated with the wind driven machine, such as a wind speed, a pitch angle, or a power output of the wind driven machine. The operating condition at block 210 can also be part of an operational test associated with the wind driven machine. An operational test can include any functional test associated with the wind driven machine, such as a cable twist release test, a yaw operational test, or a pitch battery test.

At block 215, a determination can be made as to whether or not the one or more components being operated in the wind driven machine at block 205 is operating at the operating condition being provided at block 210. If the one or more components being operated in the wind driven machine at block 205 is not operating at the operating condition being provided at block 210, one or more components can continue to operate. If the one or more component being operated in the wind driven machine at block 205 is operating at the operating condition being provided at block 210, however, the method 200 can continue at block 220.

At block 220, operating data for the one or more components can be measured. Operating data for the wind driven machine can be related to an electrical characteristic of the component in the wind driven machine, such as a current, voltage, impedance, or power characteristic. In one embodiment, an electrical sensor can be used to measure the operating data for the wind driven machine. In another embodiment, an electrical sensor in combination with or as a part of another module, such as data collection module 160 in system 100, can be used to measure operating data for the component in the wind driven machine.

Block 225 can filter the operating data measured for the one or more components. Filtering the operating data for the one or more components at block 225 can condition the operating data and can reduce distortions and/or disruptions that may exist in the operating data, such as from temporary fluctuations in certain parameters, conditions, and/or measurements. It will be appreciated that while block 225 is illustrated in method 200 as being implemented after operating data for the one or more components in the wind turbine is measured, block 225 can also be implemented before operating data is measured in block 220 or as a part of block 220.

At block 230, operating data for the one or more components in the wind driven machine at a reference condition can be provided. Operating data for a reference condition can be associated with a mathematical determination, an estimate, be based on historical data, or be previously defined. In one embodiment, operating data for a reference condition can be statistically determined and based on historical operational data for one or more components over a period of time or over one or more operational parameters. In another embodiment, operating data for a reference condition can be based on one or more measurements recorded during one or more test conditions. In another embodiment, operating data for a reference condition can be determined according to industry standards, legal regulations, or design constraints. In other embodiments, any combination of the above methods for providing operating data for a reference condition can be provided.

Method 200 can continue at block 235 and can determine whether the operating data for the one or more components is similar to the operating data for the one or more components at the reference condition. For example, in one embodiment, the operating data for the one or more components can be compared to operating data for the one or more components at a reference condition. When comparing the operating data, an alert condition may be evidenced by the difference between a reference value and a real time value as measured from the one or more components at the operating condition.

If one or more component alert conditions exist, then method 200 can proceed to block 240 where an indicator of the one or more component alert conditions can be provided. An indicator can be associated with a warning signal, a wind driven machine command signal, or a component command signal. In one embodiment, a warning or fault message can be provided at block 240 such as via warning system 150 in system 100. A warning or fault message can indicate a component alert condition and/or can request manual inspection of the wind driven machine and/or component. In another embodiment, the wind driven machine can be derated according to one or more command signals provided to the wind driven machine at block 240. In other embodiments, the failed component can be isolated according to one or more command signals provided to the component at block 240. One or more command signals for isolating the one or more malfunctioning components can include, for example, command signals for utilizing a brake or interrupting power to the malfunctioning component. In still other embodiments, any combination of the above indicators can be provided at block 240.

Outputting an indicator at block 240, such as a warning or fault message, can identify a need for timely or untimely maintenance for the wind driven machine and can thus reduce unnecessary damage associated with wind driven machine operation when there is a malfunctioning component. Similarly, outputting an indicator at block 240 for isolating the one or more malfunctioning components and/or modifying the wind driven machine's operation to account for the malfunctioning component can likewise reduce unnecessary damage. Consequently, embodiments of the invention can reduce the risk of damage associated with lengthy maintenance intervals, and by isolating or indicating the one or more malfunctioning components, embodiments of the invention can enable better maintenance practices. Reduced damage and better maintenance practices are at least some technical effects of the invention. Furthermore, because malfunctioning components can be isolated and/or indicated and the wind turbine modified for continued operation, embodiments of the invention can avoid power disruptions associated with malfunctioning components in a wind driven machine. More reliable power production from a wind driven machine is at least one other technical effect of the invention.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for monitoring and controlling a wind driven machine, the method comprising:
    operating at least one component in the wind driven machine at an operating condition, wherein the operating condition is associated with at least an operational test associated with the wind driven machine, and wherein the operational test comprises a cable twist release test;
    determining whether one or more component alert conditions exist based at least in part on an electrical characteristic associated with the at least one component; and
    outputting at least one indicator when one or more component alert conditions exist.

2. The method of claim 1, wherein the at least one component comprises at least one of the following: a yaw control component or a pitch control component.

3. The method of claim 1, wherein the operating condition is further associated with an ambient condition associated with the wind driven machine.

4. The method of claim 3, wherein the ambient condition associated with the wind driven machine comprises at least one of the following: a wind speed, a pitch angle, or a power output of the wind driven machine.

5. The method of claim 1, wherein the operational test associated with the wind driven machine further comprises a pitch battery test.

6. The method of claim 1, wherein determining whether one or more component alert conditions exist based at least in part on an electrical characteristic comprises determining whether one or more component alert conditions exist based at least in part on a current characteristic associated with the at least one component.

7. The method of claim 1, wherein determining whether one or more component alert conditions exist further comprises filtering operating data associated with the operating condition.

8. The method of claim 1, wherein determining whether one or more component alert conditions exist further comprises comparing operating data associated with the operating condition to operating data associated with at least one reference condition.

9. The method of claim 1, wherein outputting at least one indicator comprises at least one of the following: outputting a warning signal, outputting a command signal, utilizing at least one brake associated with the at least one component, interrupting power being provided to the at least one component, or lowering the maximum amount of electrical current the wind driven machine can carry before sustaining damage.

10. A system comprising:
    a wind driven machine comprising at least one component operable to operate at an operating condition;
    at least one data collection module operable to collect operating data associated with the at least one component, wherein the at least one component comprises a yaw control component to provide yaw orientation for the wind driven machine; and
    at least one data processing module operable to:
        receive operating data from the at least one data collection module, wherein the operating data comprises an electrical characteristic associated with the at least one component;
        determine whether one or more component alert conditions exist based at least in part on the electrical characteristic associated with the at least one component; and
        output at least one indicator when one or more component alert conditions exist.

11. The system of claim 10, further comprising:
    at least one sensor coupled to the at least one data collection module, wherein the at least one sensor is operable to provide information associated with the at least one component to the data collection module.

12. The system of claim 10, further comprising:
    at least one filter coupled to the at least one data collection module and operable to condition the operating data provided to the at least one data processing module.

13. The system of claim 10, wherein the at least one component further comprises a pitch control component.

14. The system of claim 10, wherein the operating data is associated with a current characteristic of the at least one component.

15. The system of claim 10, wherein the at least one data processing module is operable to determine whether one or more component alert conditions exist by comparing operating data associated with the operating condition to operating data associated with at least one reference condition.

16. The system of claim 10, wherein the at least one indicator comprises at least one of the following: a warning signal, a command signal, a signal for utilizing at least one brake associated with the at least one component, a signal for interrupting power being provided to the at least one component, or a signal for derating the wind driven machine.

17. An apparatus comprising:
    at least one data collection module operable to collect operating data associated with at least one component of a wind driven machine, wherein the at least one component comprises a yaw control component to provide yaw orientation for the wind driven machine; and
    at least one data processing module operable to:
        receive operating data from the at least one data collection module, wherein the operating data comprises an electrical characteristic associated with the at least one component;
        determine whether one or more component alert conditions exist based at least in part on the electrical characteristic associated with the at least one component; and
        output at least one indicator when one or more component alert conditions exist.

18. The apparatus of claim 17, further comprising at least one sensor operable to provide information associated with the at least one component to the data collection module.

19. The apparatus of claim 17, further comprising at least one filter coupled to the at least one data collection module and operable to condition the operating data provided to the at least one data processing module.

20. The apparatus of claim 17, wherein the at least one component further comprises a pitch control component.

* * * * *